(12) United States Patent
Inoko et al.

(10) Patent No.: US 8,405,325 B2
(45) Date of Patent: Mar. 26, 2013

(54) LED LIGHTING POWER SOURCE AND LED LIGHTING SYSTEM

(75) Inventors: Osamu Inoko, Tokyo (JP); Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 253 days.

(21) Appl. No.: 13/061,543

(22) PCT Filed: Jul. 22, 2009

(86) PCT No.: PCT/JP2009/003424
§ 371 (c)(1),
(2), (4) Date: Mar. 1, 2011

(87) PCT Pub. No.: WO2010/050096
PCT Pub. Date: May 6, 2010

(65) Prior Publication Data
US 2011/0175530 A1     Jul. 21, 2011

(30) Foreign Application Priority Data

Oct. 30, 2008  (JP) .................. 2008-279657

(51) Int. Cl.
*B60Q 1/00*     (2006.01)
*H05B 37/02*    (2006.01)
(52) U.S. Cl. ................ 315/360; 315/82; 362/545

(58) Field of Classification Search ............. 315/360, 315/82, 192, 282, 186, 212, 254, 297; 362/545
See application file for complete search history.

(56) References Cited

U.S. PATENT DOCUMENTS

| 2004/0213015 A1* | 10/2004 | Ito et al. ............... 362/545 |
| 2008/0238324 A1  | 10/2008 | Ishii |
| 2011/0291575 A1* | 12/2011 | Shiu et al. ............. 315/192 |

FOREIGN PATENT DOCUMENTS

| JP | 2007-45250 A  | 2/2007 |
| JP | 2007-234414 A | 9/2007 |
| JP | 2008-207596 A | 9/2008 |
| JP | 2008-251320 A | 10/2008 |

\* cited by examiner

*Primary Examiner* — Daniel D Chang
(74) *Attorney, Agent, or Firm* — Birch, Stewart, Kolasch & Birch, LLP

(57) ABSTRACT

Problem to be Solved: In left and right independent lighting power sources, even when left and right light-emitting units each including one or a plurality of LEDs light up with a time difference, the quality of emission as headlamps is increased by making it difficult to visually identify the time difference. Solution: A DC/DC converter for supplying the electric power supplied by a battery to the light-emitting unit is operated to change the current supplied to the light-emitting unit such that the current is gradually increased to attain a rated current, to thus avoid the case where one of the left and right headlamps enters a lighting state, when the other does not light up yet.

11 Claims, 13 Drawing Sheets

| Rise Time[ms] \ Amount of Emission | 1/10 | 1/3 | 1/2 | 1 |
|---|---|---|---|---|
| 0 | 23.1 | 21.6 | 20.4 | 20.9 |
| 20 | 23.7 | 22.4 | 21.9 | 21.7 |
| 40 | 24.4 | 23.5 | 23.4 | 22.3 |
| 80 | 29.2 | 26.6 | 27.0 | 26.1 |

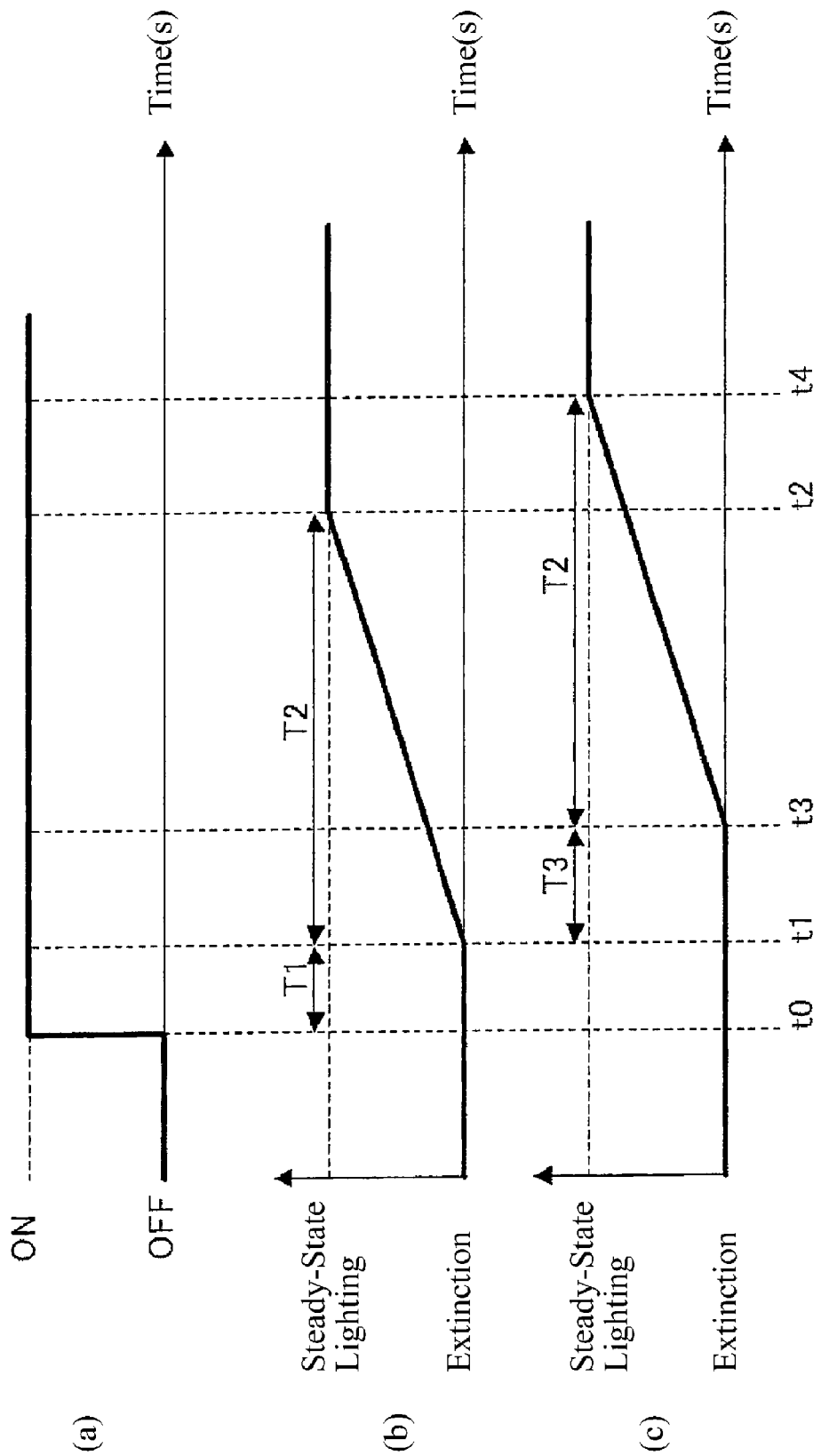

LED LIGHTING POWER SOURCE AND LED LIGHTING SYSTEM

TECHNICAL FIELD

The present invention relates to an LED (Light Emitting Diode) lighting device and an LED lighting system for lighting an LED for a vehicle headlamp.

BACKGROUND ART

Typically, an LED used for a vehicle headlamp and a lighting power source for controlling the lighting of the LED are independently provided on left and right sides of the front of a vehicle. Therefore, because of the individual differences of the lighting power sources, in an arrangement such that it is perceived that left and right LEDs light with a time difference, a driver of the vehicle or an observer of the illumination light may have a strange or unpleasant feeling. The strange feeling reduces the quality of emission as a headlamp.

An example for solving this problem includes the one for lighting LEDs for left and right headlamps with a single lighting power source (Patent Document 1).

PRIOR ART DOCUMENTS

Patent Documents

Patent Document 1: JP-A-2007-45250

SUMMARY OF THE INVENTION

Problem to be Solved by the Invention

However, in the lighting power source system disclosed in Patent Document 1, the LEDs for the left and right headlamps are lit by the single lighting power source; thus, there is the problem that when the lighting power source has broken down, the left and right LEDs are turned off at the same time.

The present invention has been made to solve the above-mentioned problems, and an object of the present invention is to provide left and right independent lighting power sources having left and right light-emitting units (LED), respectively, which improves the emission quality as headlamps by making it difficult to visually identify a time difference, even when the left and right light-emitting units light with the time difference.

Means for Solving the Problem

An LED lighting power source for a headlamp that is provided for each of left and right headlamps of a vehicle, and independently light respective light-emitting units for the left and right headlamps, the light-emitting units each including one or a plurality of LEDs, the power source includes: a supplying unit for supplying the electric power supplied from a battery to the light-emitting unit for a vehicle headlamp; a current detecting unit for detecting the current flowing to the light-emitting unit to which the electric power is supplied by the supplying unit; a current setting unit for setting a target current of the current flowing to the light-emitting unit; and a current control unit for controlling the supplying unit such that the current detected by the current detecting coincides with the target current, and wherein the current setting unit increases the target with the passage of time by taking a period of 5 ms to 4000 ms, after the supplying unit has begun to supply electric power to the light-emitting unit, wherein the current control unit sequentially increases the current flowing to the light-emitting unit by controlling the supplying unit in accordance with the target current increasing with the passage of time to cause the current to attain the steady-state lighting current of the lighting-emitting unit.

Effect of the Invention

According to the present invention, when the current flowing to the light-emitting unit is increased so as to coincide with the target current increasing with time, the rate of increase of the amount of emission in the light-emitting unit is reduced, which enables to make it difficult to visually identify the time difference in the lighting-up of the left and right light-emitting units.

BRIEF DESCRIPTION OF THE DRAWINGS

FIG. 14 is a graph showing variations in the respective amounts of emission of the light-emitting units 4L and 4R in accordance with the embodiment of the present invention.

BEST MODE FOR CARRYING OUT THE INVENTION

First Embodiment

Figure 1:
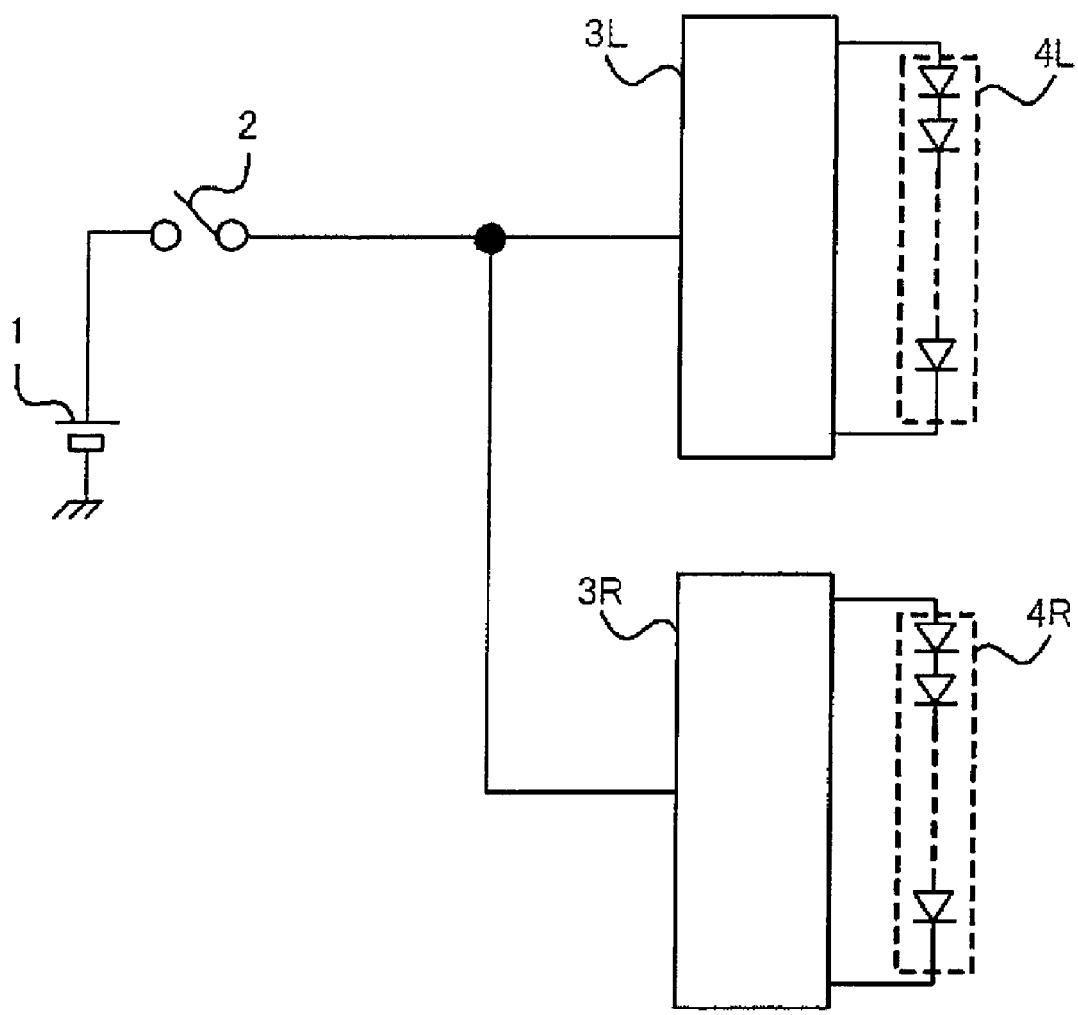
FIG. 1 is a block diagram of an LED lighting system in accordance with an embodiment of the present invention.

FIG. 1 is a block diagram of an LED lighting system for lighting an LED for a headlamp. The LED lighting system is composed of a battery 1, a lighting switch 2, a lighting power source 3L, alighting power source 3R, a light-emitting unit 4L, and a light-emitting unit 4R.

Referring to FIG. 1, the battery 1 outputs a DC voltage of 12 V or 24 V. The lighting switch 2 supplies electric power from the battery 1 to the lighting power sources 3L, 3R by the operation of a driver of a vehicle. The lighting power sources 3L, 3R control the lighting of the light-emitting units 4L, 4R, respectively, with the battery 1 as a power source. The arrangements of the lighting power sources 3L, 3R will be described later. The light-emitting units 4L, 4R are each composed of a plurality of LEDs connected in series. The rated current of one LED is 0.7 A, for example.

Figure 2:
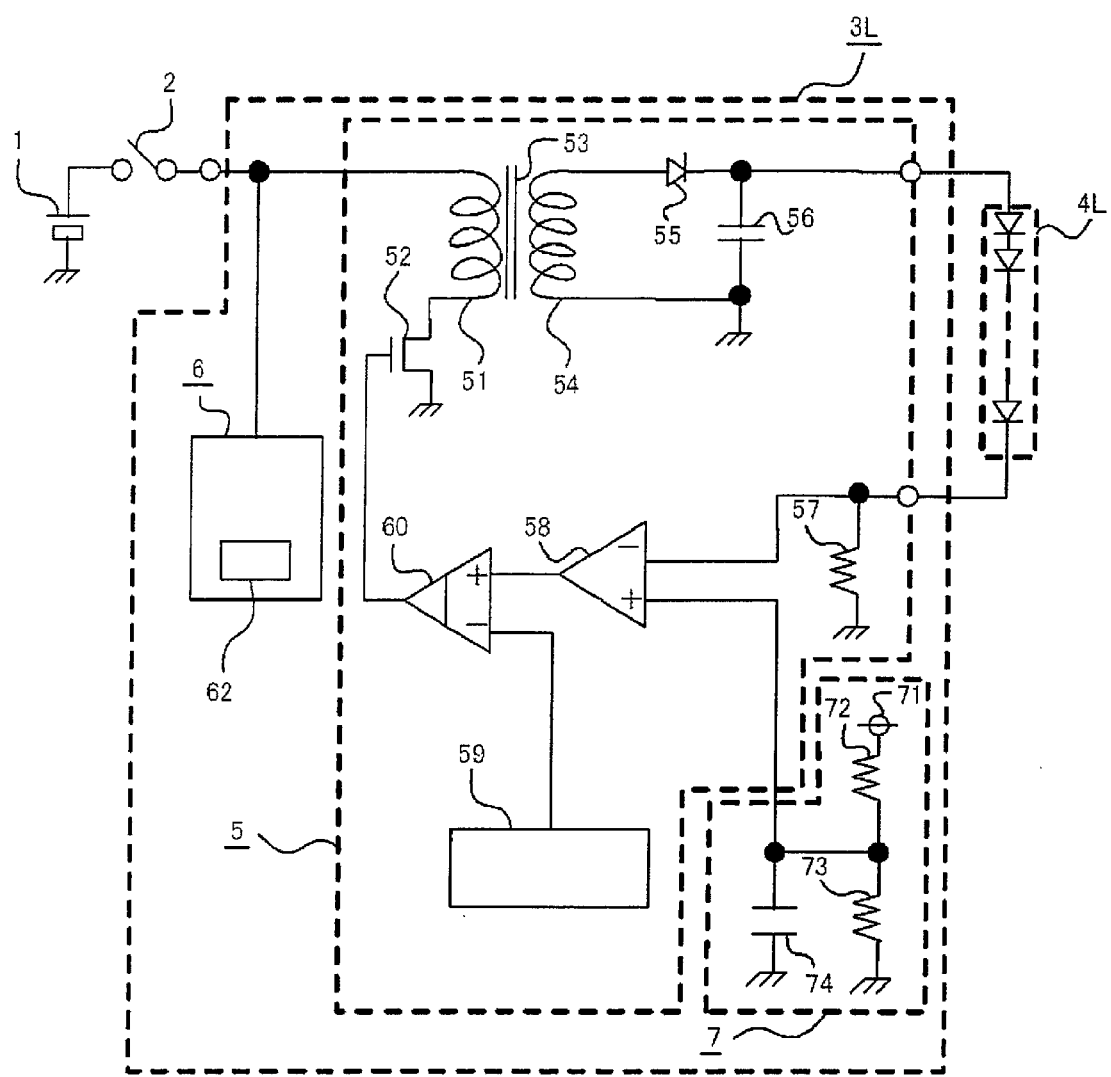
FIG. 2 is a circuit diagram of a lighting power source 3L in accordance with the embodiment of the present invention.

FIG. 2 is a view showing a circuit construction of the lighting power source 3L. Since the circuit construction of the lighting power source 3R is the same as the lighting power source 3L, the description is omitted about the lighting power source 3R and the light-emitting unit 4R lit by the lighting power source 3R. In FIG. 2, the lighting power source 3L is composed of a DC/DC converter 5, a reference supply 6, and a setting value generation circuit 7.

The DC/DC converter 5 is composed of a primary winding 51, a transistor 52, a core 53, a secondary winding 54, a diode 55, a capacitor 56, a shunt resistor 57, an error amplifier 58, a triangular wave generator 59, and a comparator 60.

The primary winding 51 is connected to the battery 1 through the lighting switch 2, and converts the electric power supplied by the battery 1 into magnetic energy to store the energy therein. The transistor 52 is connected in series to the primary winding 51, and controls the storage and the discharge of the magnetic energy by the primary winding 51 by inputting an "ON" or "Off" signal from the comparator 60. The core 53 stores the magnetic energy discharged by the primary winding 51, and discharges the energy to the secondary winding 54. In the secondary winding 54, an AC voltage is generated therein by the magnetic energy discharged from the core 53. The diode 55 and the capacitor 56 constitute a rectifying circuit, and rectify the voltage generated in the secondary winding 54 to a DC voltage. The shunt resistor 57 is connected between the light-emitting unit 4L and the inverting terminal of the error amplifier 58, and the shunt resistor 57 applies the voltage corresponding to the current having flowed to the light-emitting unit 4L to the inverting terminal of the error amplifier 58. The resistance of the shunt resistor 57 is assumed to be 1Ω, for example. The error amplifier 58 amplifies the difference between the voltage applied to the inverting terminal thereof and corresponding to the current having flowed to the light-emitting unit 4L and the voltage which is outputted from the setting value generation circuit 7 and applied to the non-inverting terminal thereof, and applies the error voltage obtained by amplifying the difference to the non-inverting terminal of the comparator 60. The triangular wave generation circuit 59 generates a triangular wave having a frequency of 100 kHz, for example, and applies the triangular wave to the inverting terminal of the comparator 60. The comparator 60 compares the triangular wave applied to the inverting terminal thereof with the error voltages applied to the non-inverting terminal thereof. Based on the result of comparison, in the period when the triangular wave is smaller than the error voltage, a voltage of 5 V is applied to the transistor 52 to turn on the transistor 52. On the other hand, in the period when the triangular wave is larger than the error voltage, the application of the voltage to the transistor 52 is stopped to turn off the transistor 52.

Additionally, the primary winding 51, the transistor 52, the core 53, the secondary winding 54, the diode 55, and the capacitor 56 constitutes a supplying unit; the shunt resistor 57 corresponds to a current value detecting unit; the setting value generation circuit 7 corresponds to a current setting unit; and the error amplifier 58, the triangular wave generator 59, and the comparator 60 corresponds to a current control unit.

The reference supply 6 generates a certain reference voltage, for instance, a reference voltage of 5 V, based on the output voltage of the battery 1, and outputs the voltage to a reference voltage source 71 (described later) in the setting value generation circuits 7. The reference supply 6 includes a reset circuit 62, and in the start-up period until the DC/DC converter 5 goes to a state where the converter steadily operates by the reset circuit 62, the reference supply 6 does not output the reference voltage, but outputs a voltage of 0 V. The setting value generation circuit 7 outputs a voltage corresponding to a target current to the DC/DC converter 5. The setting value generation circuit 7 is composed of the reference voltage source 71, a resistor 72, and a resistor 73, and a capacitor 74. The reference voltage source 71 has generated therein the reference voltage (of 5 V in the above-discussed case) outputted by the reference supply 6. The resistors 72, 73 constitute a voltage-dividing circuit, and the voltage-dividing circuit generates the voltage obtained by dividing the reference voltage based on the ratio of the resistance values of the resistors 72, 73. The capacitor 74 has applied thereto the reference voltage divided by the resistors 72, 73, and is thereby charged with time. When the reference voltage is 5 V, e.g., if the resistance values of the resistors 72, 73 are 24 kΩ and 3.9 kΩ, respectively, the capacitor 74 is charged up to 0.7 V. The voltage of the capacitor 74 is applied to the non-inverting terminal of the error amplifier 58 of the DC/DC converter 5.

The operation of the lighting power source 3L is as follows. When a driver of a vehicle switches the lighting switch 2 to the ON state, the battery 1 begins to supply electric power to the DC/DC converter 5 and the reference supply 6. The reference supply 6 generates a certain reference voltage (5 V, e.g.) from the voltage (12 V, e.g.) of the battery 1; however, as discussed above, in the start-up period until the DC/DC converter 5 goes to a state where the converter steadily operates, the reference supply does not output the reference voltage, but outputs a voltage of 0 V. Therefore, until the reference voltage is generated, the value of the reference voltage source 71 of the setting value generation circuit 7 is 0 V, and the non-inverting terminal of the error amplifier 58 has a voltage of 0 V applied thereto from the setting value generation circuit 7. Otherwise, when the reference voltage is generated, the reference voltage source 71 of the setting value generation circuit 7 has the reference voltage applied thereto, and the non-inverting terminal of the error amplifier 58 has applied thereto the voltage based on the reference voltage.

No current flows to the light-emitting unit 4L immediately after the lighting switch 2 is turned on. Thus, the inverting terminal of the error amplifier 58 has a voltage of 0 V applied thereto, and the non-inverting terminal of the error amplifier 58 has a voltage of 0 V applied thereto. Therefore, the output of the error amplifier 58 is 0 V, and the error voltage is lower than the voltage of the triangular wave, thus keeping the transistor 52 in an OFF state.

When a predetermined time has passed since the lighting switch 2 was turned on and the reference voltage generated in the reference supply 6 is applied to the reference voltage source 71, the capacitor 74 begins to be charged. Since the increase in the voltage of the capacitor 74 increases the voltage applied to the non-inverting terminal of the error amplifier 58, the error voltage outputted by the error amplifier 58 also increases.

There occurs a period when the error voltage is higher than the voltage of the triangular wave by the increase of the error voltage, during the period the comparator 60 holds the transistor 52 in an ON state, and stores the electric power supplied from the battery 1 in the core 53. Further, during the period except the above-discussed period, the comparator holds the transistor 52 in an OFF state to conduct the electric power stored in the core 53 to the secondary winding 54. Here, the rate, per cycle, of the period when the voltage of the non-inverting terminal is higher than that of the triangular wave, in other words, the rate per cycle of the period when the transistor 52 is in an ON state is called "Duty." That is, the larger the Duty, the more the electric power stored in the core 53, and thus the electric power conducted to the secondary winding 54 is increased; conversely, the smaller the Duty, the less the electric power stored in the core 53, and thus the electric power conducted to the secondary winding 54 is reduced. Therefore, the amount of the electric power conducted to the secondary winding 54 can be controlled by controlling the Duty.

When electric power is conducted from the primary winding 51 to the secondary winding 54, the voltage corresponding to the electric power is generated in the secondary winding 54 to charge the capacitor 56. As the capacitor 56 is charged, the voltage of the capacitor 56 is applied to the light-emitting unit 4L as an output voltage of the DC/DC converter 5, and a current flows to the light-emitting unit 4L to thereby cause the light-emitting unit 4L to emit light.

As the current flows to the light-emitting unit 4L, the voltage corresponding to the current is generated in the inverting terminal of the error amplifier 58, and thus the output of the error amplifier 58 becomes small. As the output of the error amplifier 58 becomes small, the period when the comparator 60 holds the transistor 52 in an ON state shortens, and the output of the DC/DC converter 5 also becomes small. Therefore, the current flowing to the light-emitting unit 4L also becomes small, and the voltage applied to the inverting terminal of the error amplifier 58 is reduced.

Thus, by controlling the output of the DC/DC converter 5 based on the error between the voltage generated in the setting value generation circuit 7 and the voltage corresponding to the current flowing to the light-emitting unit 4L, the lighting system can be controlled such that the output voltage of the setting value generation circuit 7 coincides with the voltage corresponding to the current flowing to the light-emitting unit 4L. The relation like Eq. (1) holds between the resistance value Rs of the shunt resistor 57, the output current I of the DC/DC converter 5, the resistance value R1 of the resistor 72, the resistance value R2 of the resistor 73, and the reference voltage V0. Thus, the output current I becoming the target current can be set using the constants (the resistance value R1, the resistance value R2, and the like) of the components constituting the lighting power source 3L.

$$Rs \times I = [R2/(R1+R2)] \times V0 \qquad \text{[Eq. (1)]}$$

Figure 3:
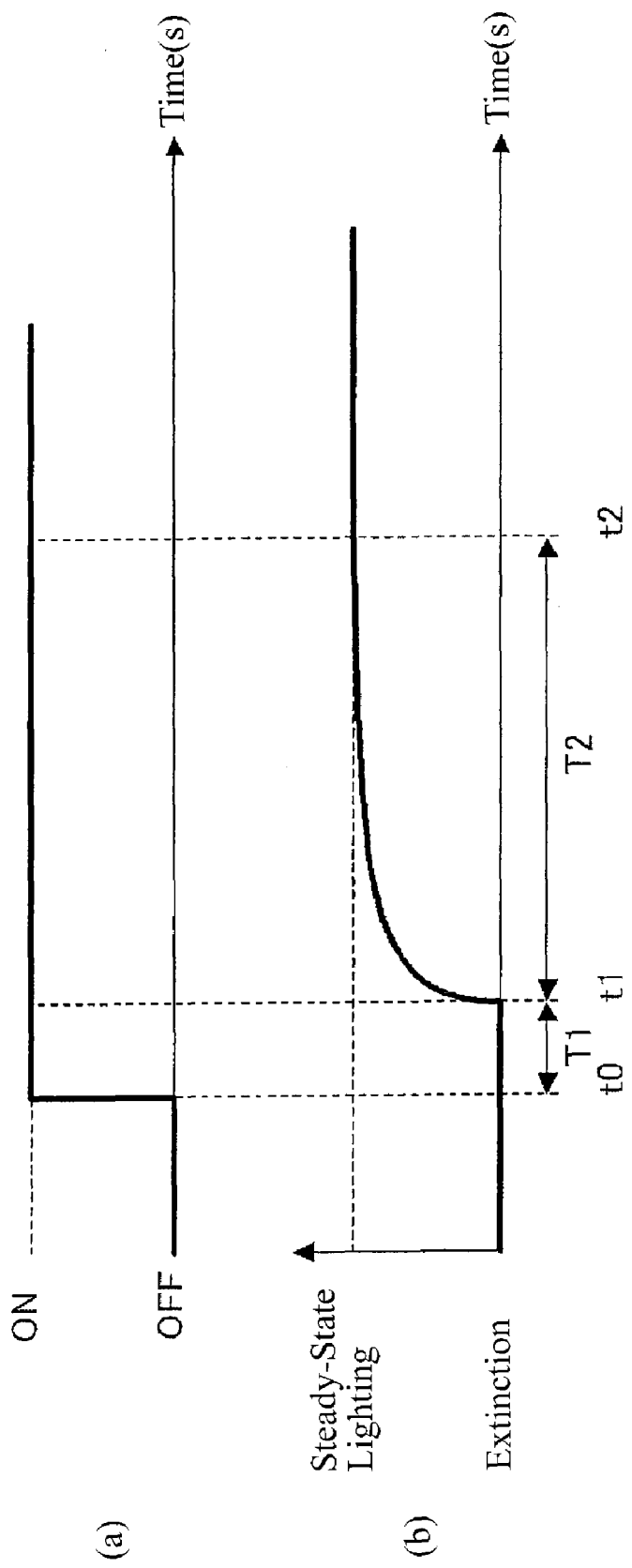
FIG. 3 is a graph showing variations in the amount of emission of a light-emitting unit 4L in accordance with the embodiment of the present invention.

FIG. 3 is a graph showing variations in the amount of emission of the light-emitting units 4L varying with time. FIG. 3(a) shows a state of the lighting switch 2, and FIG. 3(b) shows the amount of emission of the light-emitting unit 4L.

When a driver of the vehicle switches the lighting switch 2 from an OFF state to an ON state at the time t0, the voltage of the battery 1 is applied to the DC/DC converter 5 and the reference supply 6 to generate a reference voltage in the reference supply 6. Hereupon, in the preparatory period elapsed before the DC/DC converter 5 goes to a state where the converter steadily operates, the reference voltage is not outputted, and thus in the period T1 from the time t0 to the time t1, no electric power is outputted from the DC/DC converter 5, nor do the light-emitting unit 4L emit light.

When it becomes the time t1, the voltage generated by the reference supply 6 is applied to the reference voltage source 71, and the setting value generation circuit 7 begins to output the voltage. Thus, the supply of power from the DC/DC converter 5 to the light-emitting unit 4L is started. Thereafter, in the period T2 to the time t2, the output current of the DC/DC converter gradually increases, and thus the light-emitting unit 4L also has the amount of emission gradually increased therein as shown in FIG. 3(b). As the current flowing to the light-emitting unit 4L attains the steady-state lighting current of the light-emitting unit 4L at the time t2 (when a plurality of directly connected LEDs constitute the light-emitting unit 4L, the steady-state lighting current of the LEDs is 0.7 A, e.g.), the DC/DC converter afterwards controls the output to hold the current value, and thus the amount of emission of the light-emitting unit 4L also becomes constant. Here, the steady-state lighting current unit an approximately rated current; it is assumed to fall in the range of ±10 percent of the rated current.

Note that there is a correlation between the current flowing to the light-emitting unit 4L and the amount of emission of the light-emitting unit 4L; variations in the amount of emission of the light-emitting unit 4L becomes similar to those in the current. In accordance with the embodiment, a current feedback control is performed such that the current flowing to the light-emitting unit 4L coincides with a current command value based on the voltage of the capacitor 74 of the setting value generation circuit 7. The voltage of the capacitor 74 sluggishly rises by the time constants of the capacitor 74, the resistor 72, and the resistor 73, and thus the amount of emission of the LED also varies in the graphical form as shown in FIG. 3(b). In addition, the voltage of the capacitor 74 is expressed by Eq. (2) where τ is an elapsed time interval, C is the capacitance of the capacitor 94, R1 is the resistance value of the resistor 72, and R2 is the resistance value of the resistor 73.

$$V(\tau) = 1 - e^{\frac{\tau}{CR}}, \quad R = \frac{R1 \times R2}{R1 + R2} \qquad \text{[Eq. (2)]}$$

Figure 4:
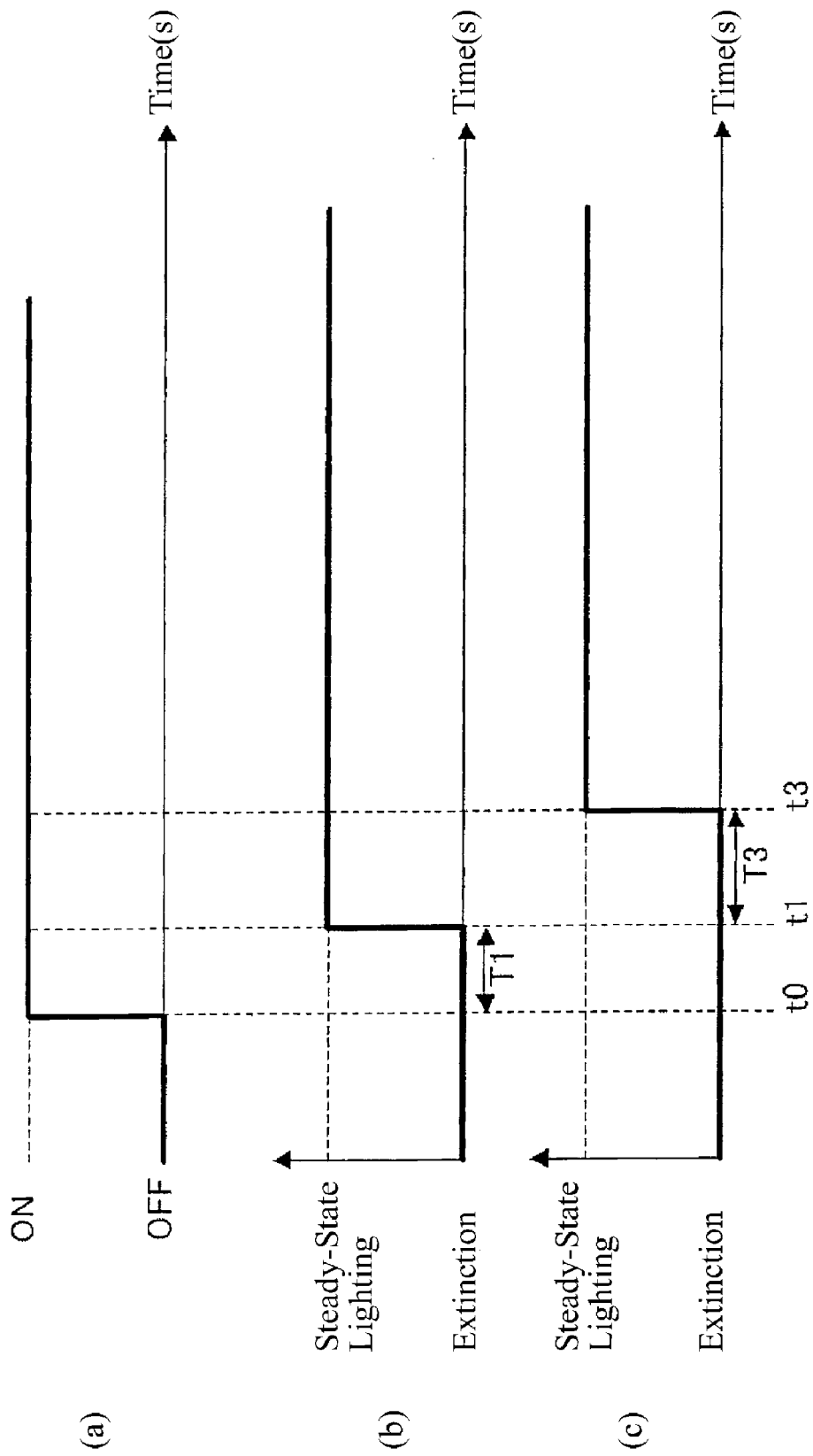
FIG. 4 is a graph showing variations in the respective amounts of emission of light-emitting units 4L and 4R in the prior art.
Figure 5:
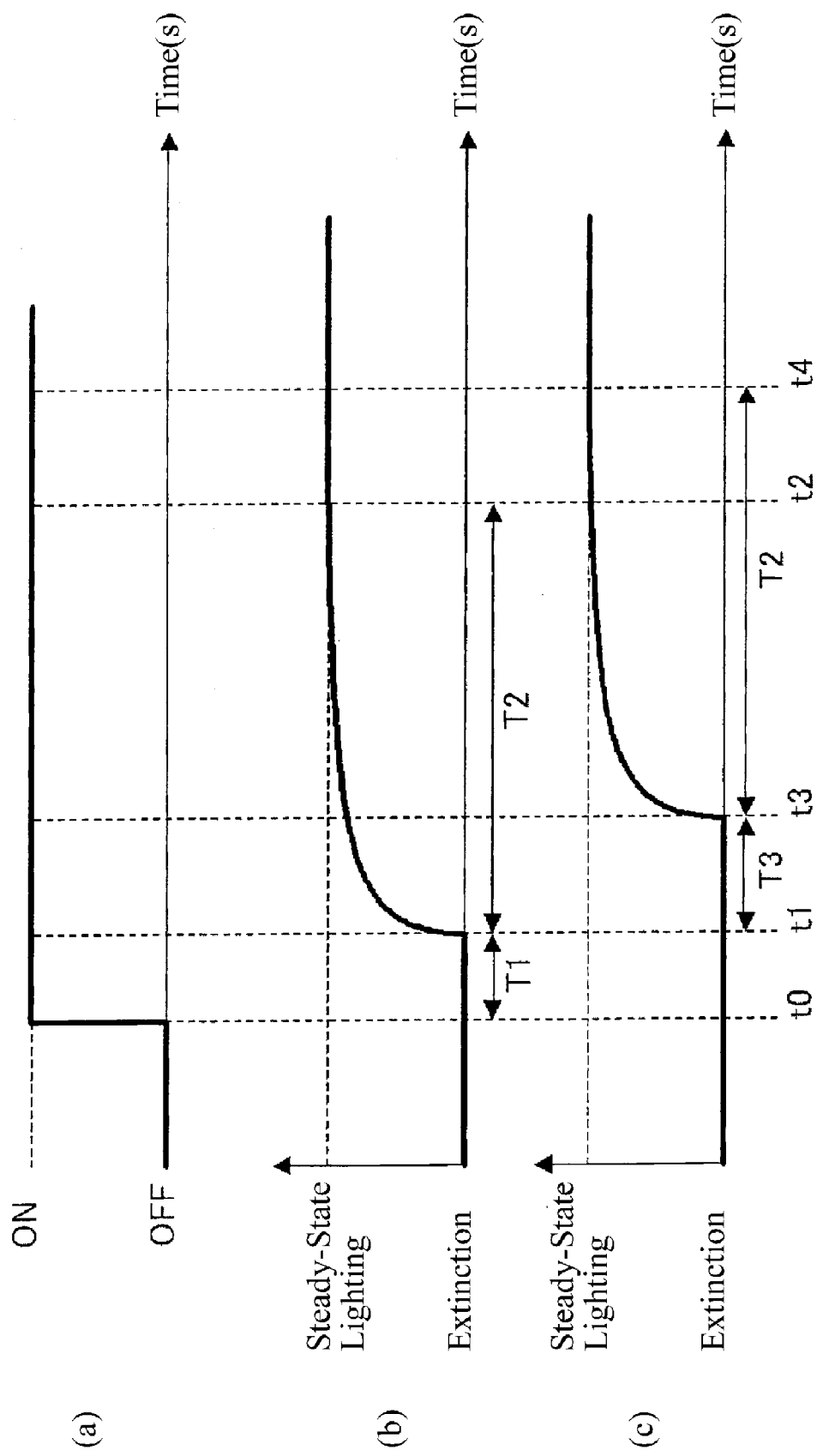
FIG. 5 is a graph showing variations in the respective amounts of emission of light-emitting units 4L and 4R in accordance with the embodiment of the present invention.

Next, a description will be given of a relationship between the amounts of emission of the light-emitting unit 4L and the light-emitting unit 4R. FIG. 4 is a graph showing the amounts of emission of the light-emitting units 4L, 4R varying with time when conventional LED headlamps are lit. FIG. 4(a) shows a state of the lighting switch 2, FIG. 4(b) shows the amount of emission of the light-emitting unit 4L, and FIG. 4(c) shows the amount of emission of the light-emitting unit 4R. FIG. 5 is a graph showing the amounts of emission of the light-emitting units 4L, 4R in accordance with the embodiment, varying with time. FIG. 5(a) shows a state of the lighting switch 2, FIG. 5(b) shows the amount of emission of the light-emitting unit 4L, and FIG. 5(c) shows the amount of emission of the light-emitting unit 4R. In FIG. 4 and FIG. 5, the parts corresponding to those of FIG. 3 are designated by similar reference numerals, and these explanations will be omitted.

When the light-emitting unit 4L and light-emitting unit 4R are lit, the time intervals required until one light-emitting unit is lit up and the other light-emitting unit is lit up are sometimes different from each other according to the individual differences of the lighting power sources. Referring to FIG. 4(b) and FIG. 4(c), the amount of emission of the light-emitting unit 4L begins increase from the time t1, whereas the amount of emission of the light-emitting unit 4R begins increase from the time t3 when the period T3 has elapsed from the time t1. An LED has a fast response; thus, when the control of lighting such as control gradually increasing the current flowing to the LED is not performed, as shown in FIG. 4(b) and FIG. 4(c), the amount of emission instantaneously rises (actually in several μs). Therefore, during the period T3, although the light-emitting unit 4L is emitting light by the rated amount of emission, the light-emitting unit 4R does not at all emit light. In that case, when the difference between the times (period T3 in FIG. 4(c)) required for lighting up the lighting power sources 3L and 3R is large, the time difference in the lighting-up of left and right headlamps is easily visually perceived to reduce the quality of emission of the two headlamps forming a pair.

On the other hand, in accordance with the embodiment, the currents flowing to the light-emitting units are controlled based on the voltage of the capacitor 74 of the setting value generation circuit 7. For this reason, as shown in FIG. 5(b), the amount of emission of the light-emitting unit 4L that lights up earlier gradually increases with the passage of time, and the amount does not attain the amount of emission of the steady-state lighting even after the period 13 is elapsed from the initiation of lighting. Thus, it is possible to make it difficult to perceive the time difference in lighting-up of the left and right headlamps by reducing the lighting speed of the light-emitting unit 4L, such that the amount of emission of the light-emitting unit 4L that lights up earlier does not reach the amount of emission in its steady-state lighting, at the time when the light-emitting unit 4R that lights up later does not start lighting yet.

An experiment was carried out about how much the time difference in lighting up was actually perceived and further to what extent the lighting speed of the light-emitting unit 4L was to be reduced, in order to make it difficult to perceive the time difference. The experiment will be described below.

The experiment was carried out to fifty test subjects about how many seconds the time in which the subjects did not feel a delay is, when two light-emitting units simulating left and right headlamps were lit with different rise times and by different amounts of emission. The results are shown in FIG. 6.

Figure 6:
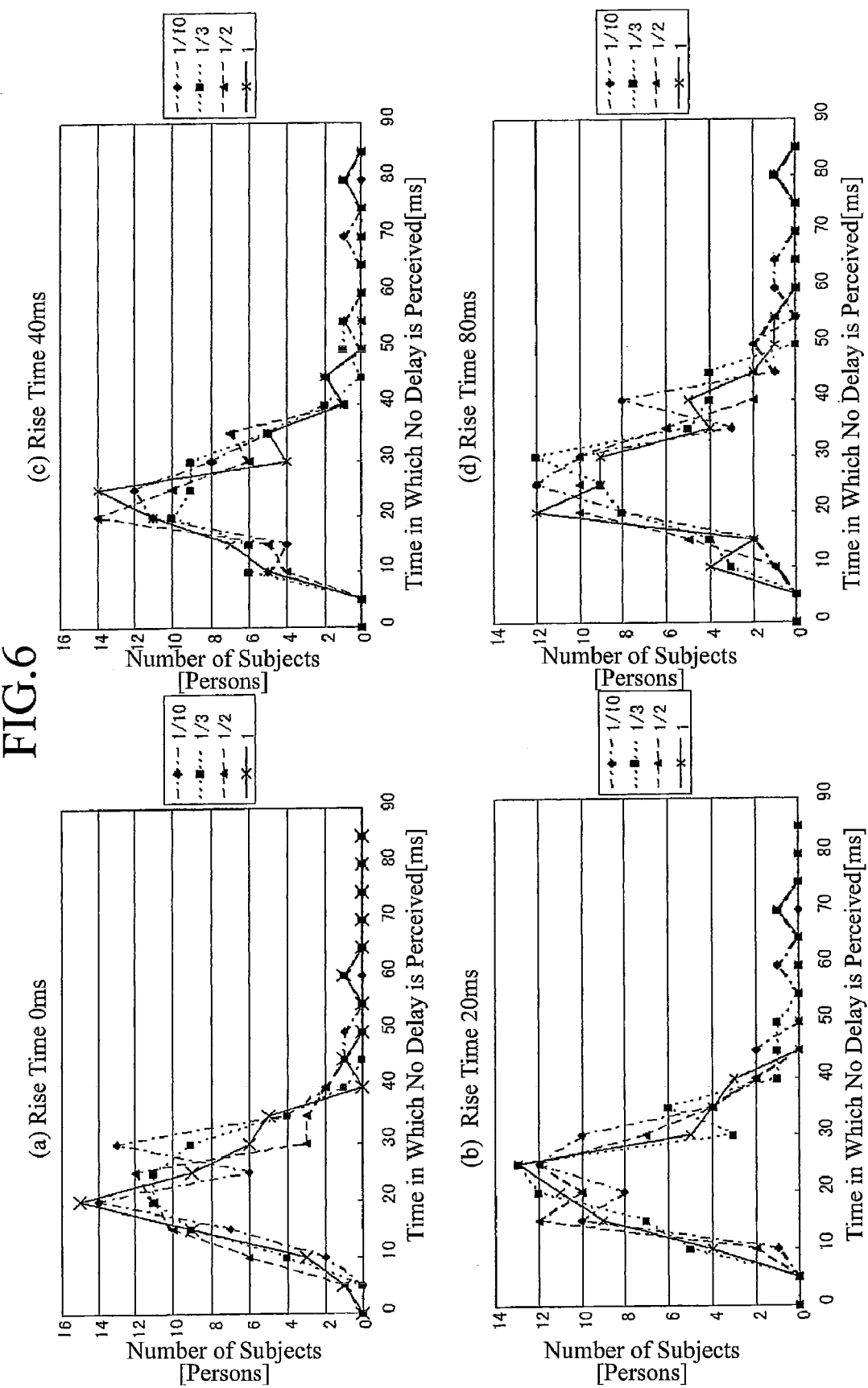
FIG. 6 is a graph showing the number of test subjects in the times in which the delay is not perceived in a predetermined rise time.

FIG. 6 is a graph showing the number of subjects in the times in which the subjects did not feel the delay with a predetermined rise time. In the figure, a solid line shows the data with one-fold rated amount of emission, a dashed line shows the data with ½-fold one, a dotted line shows the data with ⅓-fold one, and a dash and dotted line shows the data with 1/10-fold one, respectively. Further, FIG. 6(a) shows the data with a rise time of 0 ms, FIG. 6(b) shows the data with a rise time of 20 ms, FIG. 6(c) shows the data with a rise time of 40 ms, and FIG. 6(d) shows the data with a rise time of 80 ms, respectively.

FIG. 6(a) shows the data with the rise time of 0 ms as discussed above, and thus the time in which the subject did not feel the delay in FIG. 6(a) corresponds to the period T3 shown in FIG. 4(c). More specifically, FIG. 6(a) shows that if how many ms the period T3 shown in FIG. 4(c) were actually, the subjects perceived the delay in the time. Apparent from FIG. 6(a), if the period T3 was 5 ms or less, almost all the subjects did not feel the delay, and if it was 10 ms or less, about 90 percent of them did not perceive the dely. Further, it turns out that if the period T3 was 20 ms, about half of them perceived the delay, and if 40 ms, about 90 percent of them perceived the delay therein.

As discussed above, the time difference in lighting-up of the light-emitting units began to be perceived by 5 ms as a boundary that was the period after one light-emitting unit that lit up earlier attained its steady-state lighting until the other light-emitting unit started to light up. Then, if the period T2 was set to be 5 ms or more, the light-emitting unit starting to light up earlier could be lit so as not to attain its steady-state lighting yet, at the time when the light-emitting unit to be lit up later started to light up; thus, it was possible to make it difficult to perceive the time difference. Further, when the period T3 was 10 ms, about 10 percent of the subjects perceived the time difference, and thus the time difference could be further perceived with difficulty by arranging the period T2 to be 10 ms or more. Moreover, when the period T3 was 20 ms, half of them perceived the time difference, and thus the effect could be improved by arranging the period T2 to be 20 ms or more. If the period T3 was 40 ms or more, almost all the subjects perceive the time difference, and thus the effect could be further improved by setting the period T2 to be 40 ms or more.

Figures 7, 8:
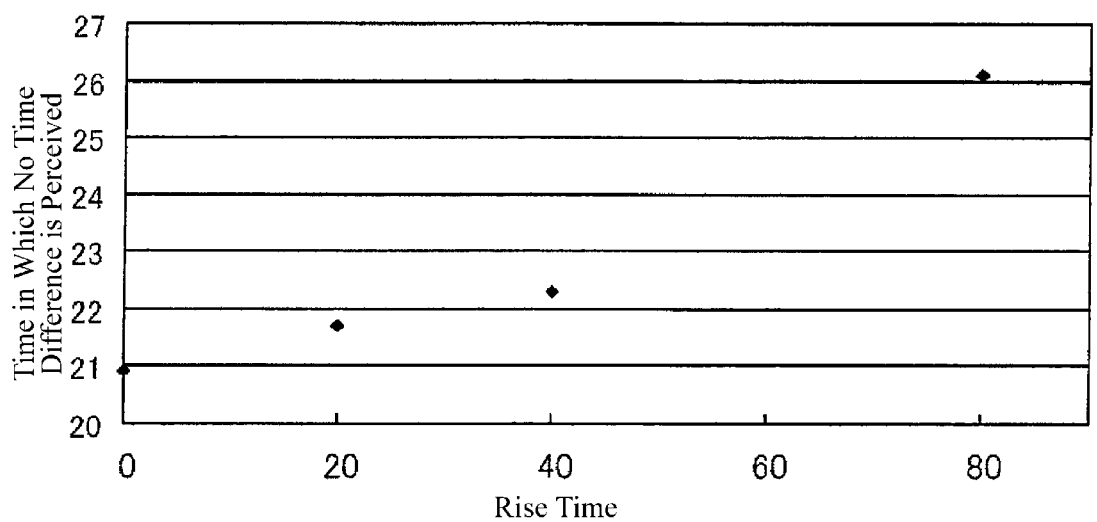
FIG. 7 is a table showing the time of which the delay is not perceived with the rise times and the amounts of emission.
FIG. 8 is a graph showing the time of which the delay is not perceived versus rise time in the one-fold rated amount of emission.

FIG. 7 is a table showing the time in which the subjects did not feel a delay with rise times and the amounts of emission. Referring to FIG. 7, it has been shown that when the amount of emission was constant, the longer the rise time, the more difficult it became to feel the delay, and when the rise time was constant, the less the amount of emission, the more difficult it became to perceive the delay. FIG. 8 is a graph plotting the time in which the delay was not perceived against rise time in the case of one-fold rated amount of emission in FIG. 7. In FIG. 8, the time in which a delay was not perceived was 22.3 ms when the rise time was 40 ms, whereas the time in which the delay was not perceived was 26.1 ms when the rise time was 80 ms, thus greatly increasing the time in which a delay was not perceived with the rise time. It was understood from the results that by setting the rise time to be 80 ms or more, it was possible to make it difficult to perceive the time difference.

Further, though an upper limit of the rise time is not particularly described hereinabove, about an HID headlamp, it is regulated that the amount of emission after four seconds is 80% or more. Thus, in accordance with the regulations, it is preferable that the upper limit to the rise time leading up to the time of steady-state lighting current is within four seconds.

Further, if the time from the time t0 when the lighting switch 2 is turned on to the time t4 when the amount of emission of the light-emitting unit (about FIG. 5, the light-emitting unit 4R shown in FIG. 5(c)) which lights up later attains the amount of emission of its steady-state lighting is 1 sec or more, a delay in response time required for lighting up the light-emitting unit to the operation of the lighting switch 2 by a driver is perceived, and thus it is preferable that the time elapsing from the time t0 to the time t4 is 1 sec or less.

As mentioned above, the lighting power sources 3L, 3R in accordance with the embodiment control the lighting, such that when the lighting switch 2 is placed in an ON state to supply electric power from the battery 1 thereto, electric power for lighting up the LEDs by the amount of emission, which is darker than the brightness of the steady-state lighting, is first supplied to the LEDs, and after the lapse of time for passing the time difference in lighting-up between the left and right headlamps, electric power for causing the LEDs to light in a steady state is supplied thereto. According to such a control, within the period when one LED which lights up earlier is darkly lighting, the other LED which lights up later lights up darkly and follows the one LED, and the time when both the left and right headlamps light up is judged to increase lighting electric power for the lighting power sources to steadily light their respective LEDs, thus enabling the LEDs to come to usually lighting. Therefore, immediately after lighting-up, the amount of emission of the LEDs is small and the LEDs irritate the eyes very little; thus, a lighting power source can be realized, which is capable of performing lighting at high quality by making a time difference inconspicuous, even if there occurs the time difference in lighting-up between the left and right headlamps.

Further, based on the voltage of the capacitor 74 which is charged with a predetermined time constant by the reference voltage source 71, the current flowing to the LED is controlled to make sluggish the increase of the amount of emission of the light-emitting unit. Thus, even when the light-emitting units of the headlights are lit by the left and right lighting power sources that are different from each other, a state where there is a large difference between the amounts of emission in the left and right light-emitting units is not continued for a long term. Therefore, the time difference required for lighting up the left and right light-emitting units is visually identified with difficulty, and thereby the quality of emission in headlamps can be improved.

However, it is also suggested as one means to reduce the variations in the time leading to the lighting start of the lighting power sources, and thereby reduce the time difference in lighting-up; however, in the construction where a preparatory period is provided for making sure the operation of a DC/DC converter, such a system is weak in instantaneously lighting up the LEDs; in order to dare to cause the system to instantaneously light up the LEDs, the system cannot help employing a corresponding construction, thus increasing the scale and the cost of the circuit, not resulting in a desirable construction. On the other hand, in accordance with the embodiment, since the capacitor 74 reduces the time difference in lighting-up, the quality of emission can be enhanced at low cost.

Second Embodiment

In accordance with the first embodiment, by performing the feedback control of the current flowing to the light-emitting unit, the rate of increase of the current flowing to the light-emitting unit is reduced; however, since an LED changes its color tone of emission depending on the magnitude of the current flowing thereto, in order to emit light in its specific color tone, it is necessary to keep the current flowing thereto at a constant magnitude. For this reason, in the second embodiment, by performing the PWM (Pulse Width Modulation) control of the current flowing to the light-emitting unit, the emission of the LED is held in a constant color tone.

Figure 9:
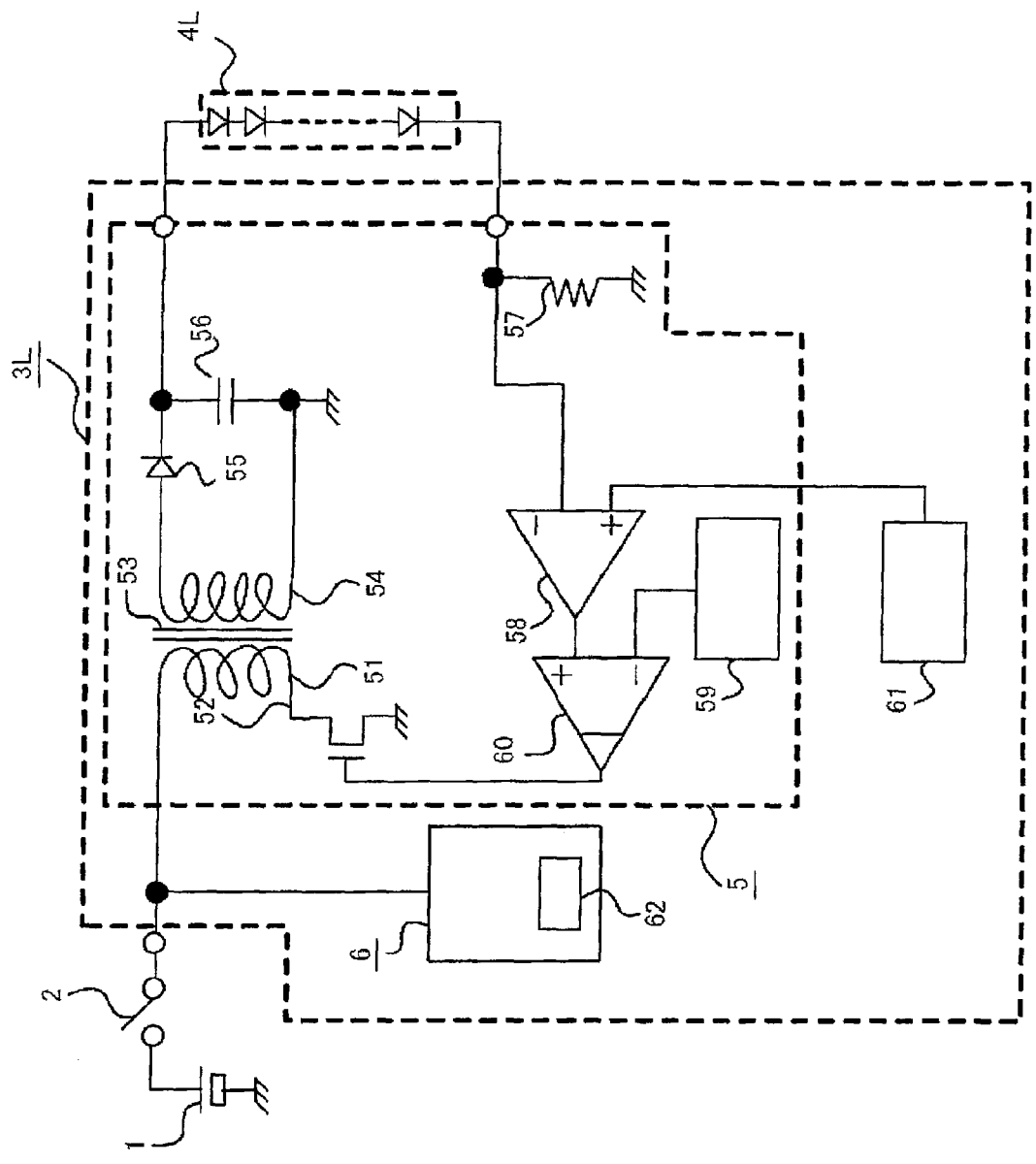
FIG. 9 is a circuit diagram of a lighting power source 3L in accordance with another embodiment of the present invention.

FIG. 9 is a circuit diagram of a lighting power source 3L in accordance with the second embodiment. In FIG. 9, the same or corresponding arrangements to those of FIG. 1 are designated by similar reference numerals, and these explanations will be omitted.

A PWM controller (PWM signal generation unit) 61 outputs a rectangular signal that is pulse-width modulated in a cycle of 5 ms or less by a peak value corresponding to a steady-state lighting current. The output of the PWM controller 61 is applied to the non-inverting terminal of the error amplifier 58, and becomes the voltage corresponding to a target current that is outputted to the DC/DC converter 5.

Figure 10:
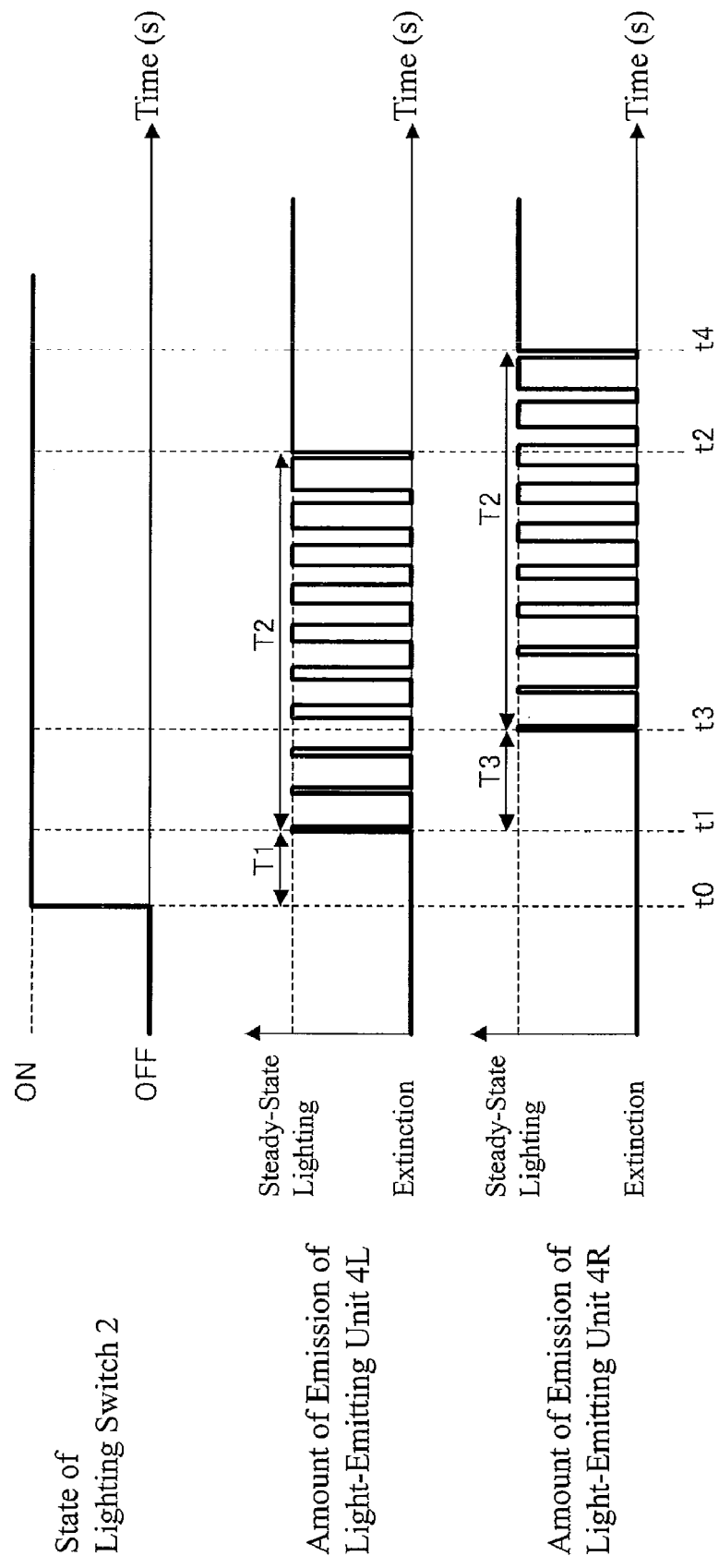
FIG. 10 is a graph showing variations in the respective amounts of emission of light-emitting units 4L and 4R in accordance with the embodiment of the present invention.

FIG. 10 is a graph showing the amounts of emission varying with time when the light-emitting units 4L, 4R are PWM controlled. FIG. 10(a) shows a state of the lighting switch 2, FIG. 10(b) shows the amount of emission of the light-emitting unit 4L, and FIG. 10(c) shows the amount of emission of the light-emitting unit 4R. In FIG. 10, the parts similar and corresponding to those of FIG. 5 are designated by similar reference numerals, and these explanations will be omitted.

Referring to FIG. 10, the output of power from the DC/DC converter 5 to the light-emitting unit 4L is started from the time t1, and the light-emitting unit 4L begins emission. The period of time when the light-emitting unit 4L lights by the amount of emission of the steady-state lighting becomes long with the passage of time. Since the cycle of lighting and extinction of the light-emitting unit 4L are repeated in a short cycle of the order of 1 ms, the light-emitting unit 41 does not seem to be blinking; thus, it is observed that the light-emitting unit seemingly gradually increases the amount of emission. The current when the light-emitting unit 4L emits light is constant; thus, the color tone of the LED does not change. Similar effects are observed with the light-emitting unit 4R.

As discussed above, the amount of emission of the LED is controlled by holding substantially constant the current which is supplied to the light-emitting units 4L, 4R, to thereby perform periodically lighting in which lighting time is short and also extinction time is long in the first stage of lighting, and performing a PWM control for increasing a lighting time rate (Duty) with the passage of time, and thereby the value (peak value) of the current supplied to the light-emitting unit can be held constant, thus enabling a delay in the lighting-up of the light-emitting unit and variations in the light-emitting color thereof to be made inconspicuous.

Note that in executing the PWM control, in order to prevent the flicker caused by blinking from being perceived, the frequency of periodically lighting is to be 200 Hz or more.

Third Embodiment

Figure 11:
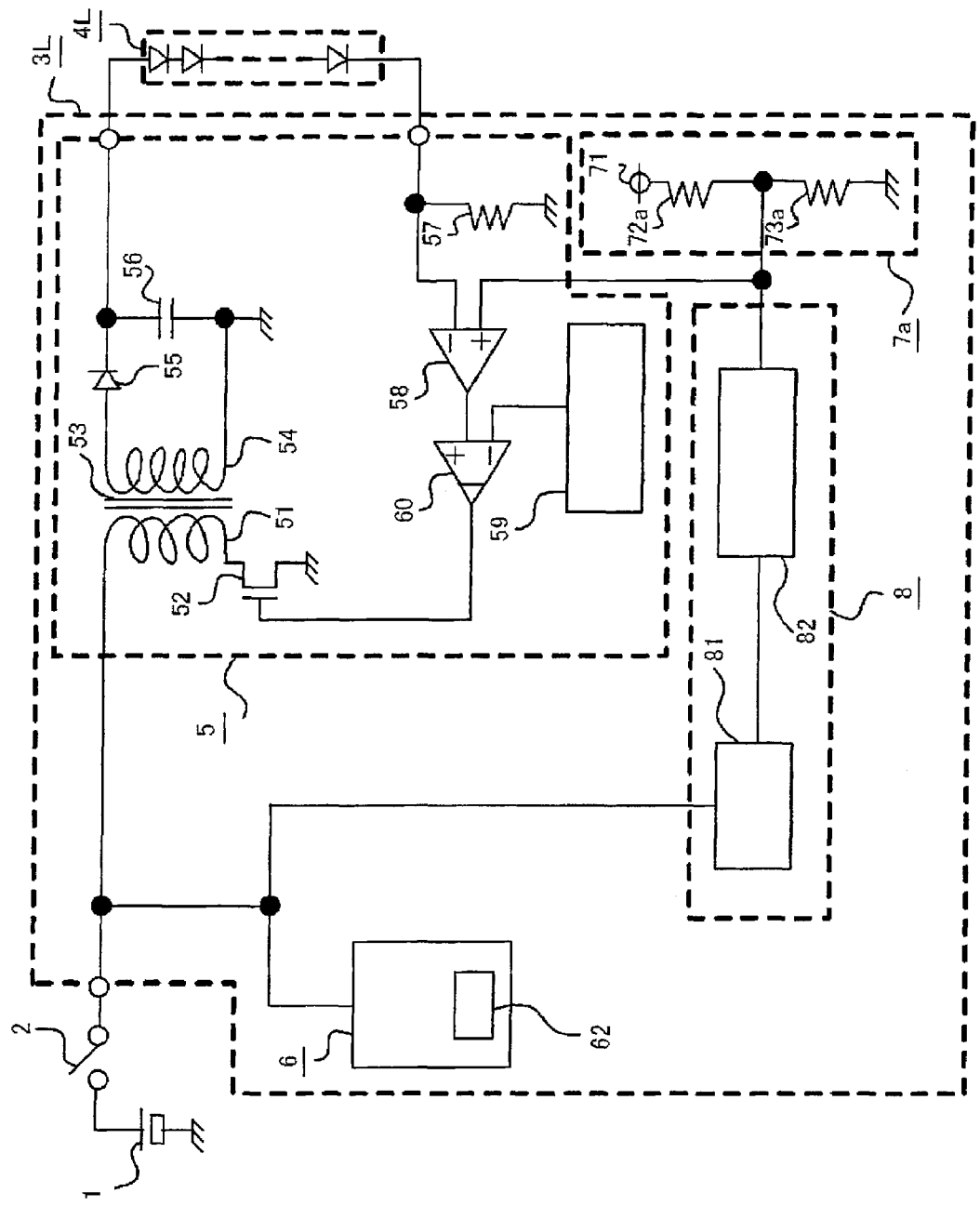
FIG. 11 is a circuit diagram of a lighting power source 3L in accordance with another embodiment of the present invention.

FIG. 11 is a circuit diagram of a lighting power source 3L in accordance with the third embodiment. The parts similar or corresponding to those of FIG. 2 are designated by similar reference numerals, and these explanations will be omitted.

In FIG. 11, a controller 8 is composed of a CPU 81 and a D/A 82. The CPU 81 has a reset circuit 83 (not shown) that outputs an RST release signal (in the same level as that of the reference voltage) after a predetermined period, when the lighting switch 2 is turned on, and carries out an initial process based on the RST release signal outputted from the reset circuit 83, and begins the output of an output signal after the completion of the initial process. The D/A 82 is constructed by an integrating circuit, and converts the output signal of the CPU 81 outputted in a PWM form to a voltage to output the voltage. A setting value generation circuit 7a is composed of resistors 72a, 73a, and sets a target output current Ia immediately after lighting by the voltage divided by the resistor 72a and the resistor 73a. Note that the setting value generation circuit 7a corresponds to a target control circuit, and the controller 8 corresponds to a target controller.

In a power-on reset period before the CPU 81 starts its operation and the initial process period of the CPU 81, the input/output of the CPU has a high impedance, and thus a circuit on the side of the CPU 81 is insulated from the power source and also from the GND. The CPU 81 is arranged to have no relation to the voltage corresponding to the target current, inputted in the DC/DC converter. In such a state, the relation like Eq. (3) holds between the resistance value Rs of a shunt resistor 57, the output current Ia, the resistance value R3 of a resistor 72a, the resistance value R4 of a resistor 73a, and the reference voltage V0. Thus, the output current Ia becoming the target current immediately after lighting-up can be set with the constants (the resistance value R3, the resistance value R4, and the like) of the components constituting the lighting power source 3L (e.g., the output current Ia is to be one-second (½) of the rated output current.).

$$Rs \times Ia = [R4/(R3+R4)] \times V0 \quad [\text{Eq. (3)}]$$

When the initial process of the CPU 81 is completed, the voltage corresponding to the target current that is outputted to the DC/DC converter 5 is switched from the value based on the output voltage of the setting value generation circuit 7a to the value based on the voltage obtained by adding the output voltage of the controller 8 to the output voltage of the setting value generation circuit 7a.

Figure 12:
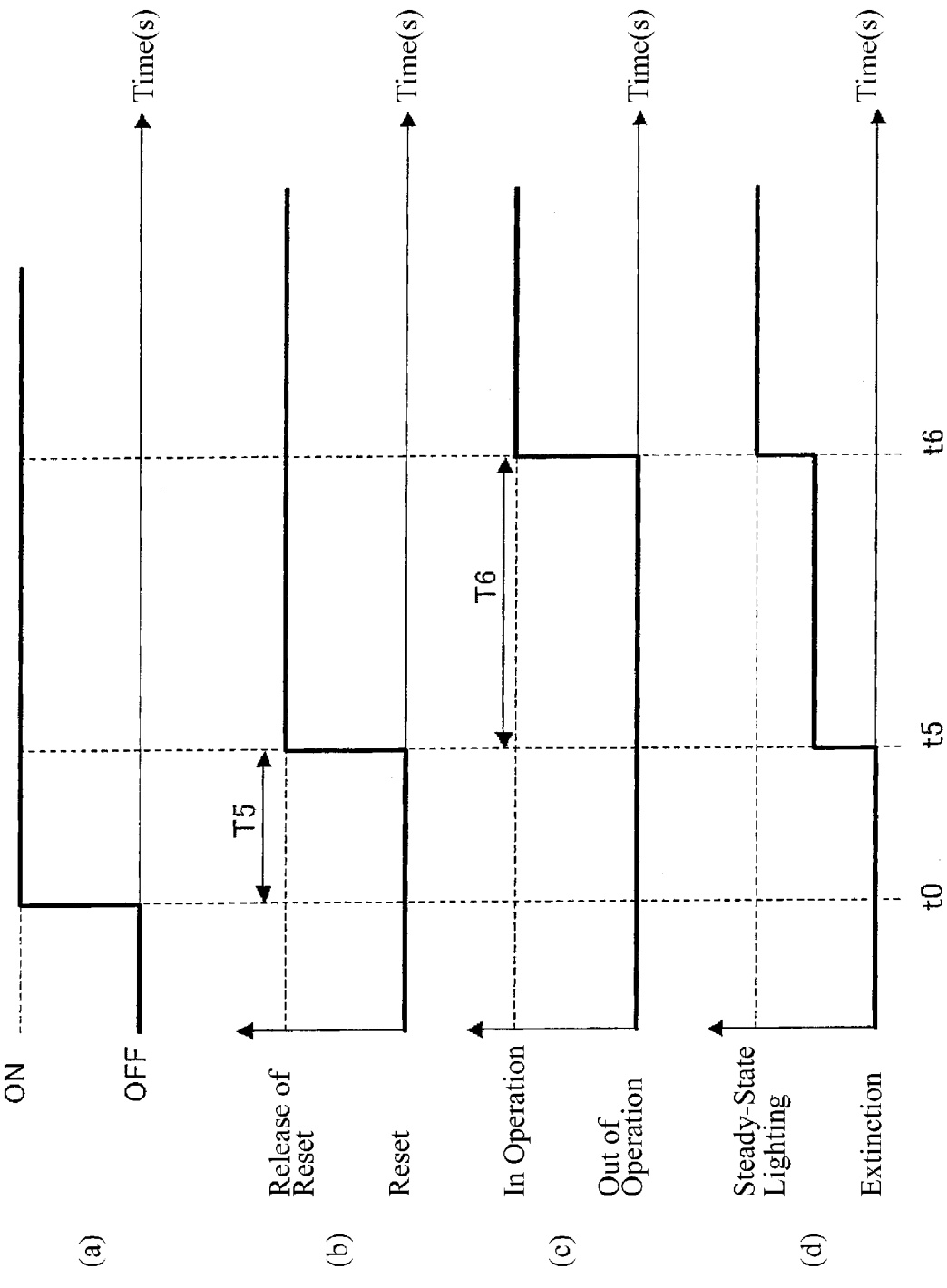
FIG. 12 is a graph showing the relationship between the operation of a CPU 81 and the respective amounts of emission of the light-emitting units 4L and 4R.

FIG. 12 is a graph showing the relationship between the operation of the CPU 81 in accordance with the third embodiment and the amount of emission of the light-emitting units 4L, 4R. FIG. 12(a) shows the state of the lighting switch 2, FIG. 12(b) shows an RST signal, FIG. 12(c) shows the operation of the CPU, and FIG. 12(d) shows the amount of emission of the light-emitting unit 4L. In FIG. 12, the parts corresponding to those of FIG. 3 are designated by similar reference numerals, and these explanations will be omitted.

From the time t5 when a reset is released, the current corresponding to the voltage {(R4/(R3+R4))×V0} generated by the division resistors is outputted from the DC/DC converter 5 to the light-emitting unit 4L based on the voltage outputted from the setting value generation circuit 7a.

The CPU 81 has stopped its operation in the period T5 until the RST release signal is inputted (power-on reset period); however, when the period T5 has elapsed since the lighting switch 2 was turned on, and at the time t5, the RST release signal is outputted from the reset circuit 83, the CPU starts the initial process. The initial process is carried out in the period T6 from the time t5 to the time t6, and when the initial process is completed, the CPU 81 starts to output the signal, and the controller 8 outputs the voltage.

After the time t6, the voltage obtained by adding the output voltage of the controller 8 to the voltage of the setting value generation circuit 7a is outputted to the DC/DC converter 5, thus generating the steady-state current in the light-emitting unit 4L.

As discussed above, according to the lighting power source in accordance with the embodiment, immediately after lighting-up, the voltage corresponding to the target current, to be inputted to the DC/DC converter 5, is introduced from the reference voltage source 71, to thereby set the voltage at a value lower than the voltage corresponding to the target current at the steady-state lighting, and after the operation of the CPU 81 has started, the voltage outputted from the CPU 81 is added to the voltage corresponding to the target current to increase the voltage corresponding to the target current. Thereby, it is possible to change the amount of emission of the light-emitting unit 4L in a stepwise fashion.

Further, the construction where the output current supplied to the LED is arbitrarily controlled by the CPU 81 can be achieved. If it is arranged that, for instance, detectors for detecting the temperature and the amount of emission of the LED are provided therein, and the output of the detectors is inputted to the CPU 81, the feedback control by the temperature and the amount of emission of the LED can be performed.

Moreover, after a head lamp is lighted by the output current corresponding to the voltage (R4/(R3+R4))×V0) generated by the division resistors for a predetermined period of time, the lamp is lit by the rated output current, to thus avoid the occurrence of the state such that one headlamp is in an extinction state, while the other one is in a lighting state by the rated output current. Therefore, this enables to make it impossible to identify the difference in lighting time between the left and right headlamps.

Furthermore, the low amount of emission immediately after lighting-up is set with the constants of the components constituting the setting value generation circuit 7a and the amount of emission in the period of time of the steady-state lighting is controlled by the output of the CPU. Thus, when the lamp lights up, it is possible to cause the light-emitting unit 4L to promptly light up by the output of the setting value generation circuit 7a, and in the period of the steady-state lighting, it is possible to control the current supplied to the LED by the CPU 81.

Hereupon, in the above, it is disclosed that at the time t6, the amount of emission of the light-emitting unit 4L reach the amount of emission at the steady-state lighting in a short time; however, it is also possible to cause the amount of emission thereof to gradually increase by controlling the output of the CPU 81.

In this context, in the above-description, it is arranged that the output of the setting value generation circuit 7a be the voltage {(R4/(R3+R4))×V0} generated by the division resistors; however, as long as the difference between the lighting-up times of the right and the left headlamps is not observed, the selection of the resistance values can be arbitrarily carried out.

In passing, in FIG. 11, it is arranged that the D/A82 be constituted by the integrating circuit; however, the converter may be constituted by a ladder circuit.

Hereupon, in the above description, it is arranged that the voltage corresponding to the target current be the voltage obtained by adding the output voltage of the controller 8 to the output voltage of the setting value generation circuit 7a; however, by removing the reference voltage source 71 and the resistor 72a, it may be arranged that the output voltage of the controller 8 be directly the voltage corresponding to the target current. At that time, from the time when the initial process the CPU 81 is completed, the lighting of the LED starts; however, it is possible to expand the dynamic range of the output current.

In addition, no explanation is particularly given hereinabove; however, it may be arranged that a capacitor be connected to the contact between the resistor 72a and the resistor 73a. At that time, it is possible to reduce the rate of change in the amount of emission at the time t1 and the rate of change in the amount of emission at the time t2.

In passing, it is also possible to provide a CPU with a function corresponding to the PWM controller 61 used in the second embodiment.

Fourth Embodiment

A plurality of LEDs are installed for a single headlamp; when LEDs each having a characteristic different from each other are attached to one headlamp, the amount of emission varies depending on the LEDs. For this reason, in installing LEDs to a headlamp, LEDs are classified into a plurality of levels according to their characteristics, and LEDs having characteristics near to each other are installed in a headlamp to obtain a predetermined amount of emission. Therefore, in order to carry out the lighting control suitable for the characteristic of the installed LEDs, there is the problem that it is necessary to prepare a lighting power source having a plurality of output characteristics.

Figure 13:
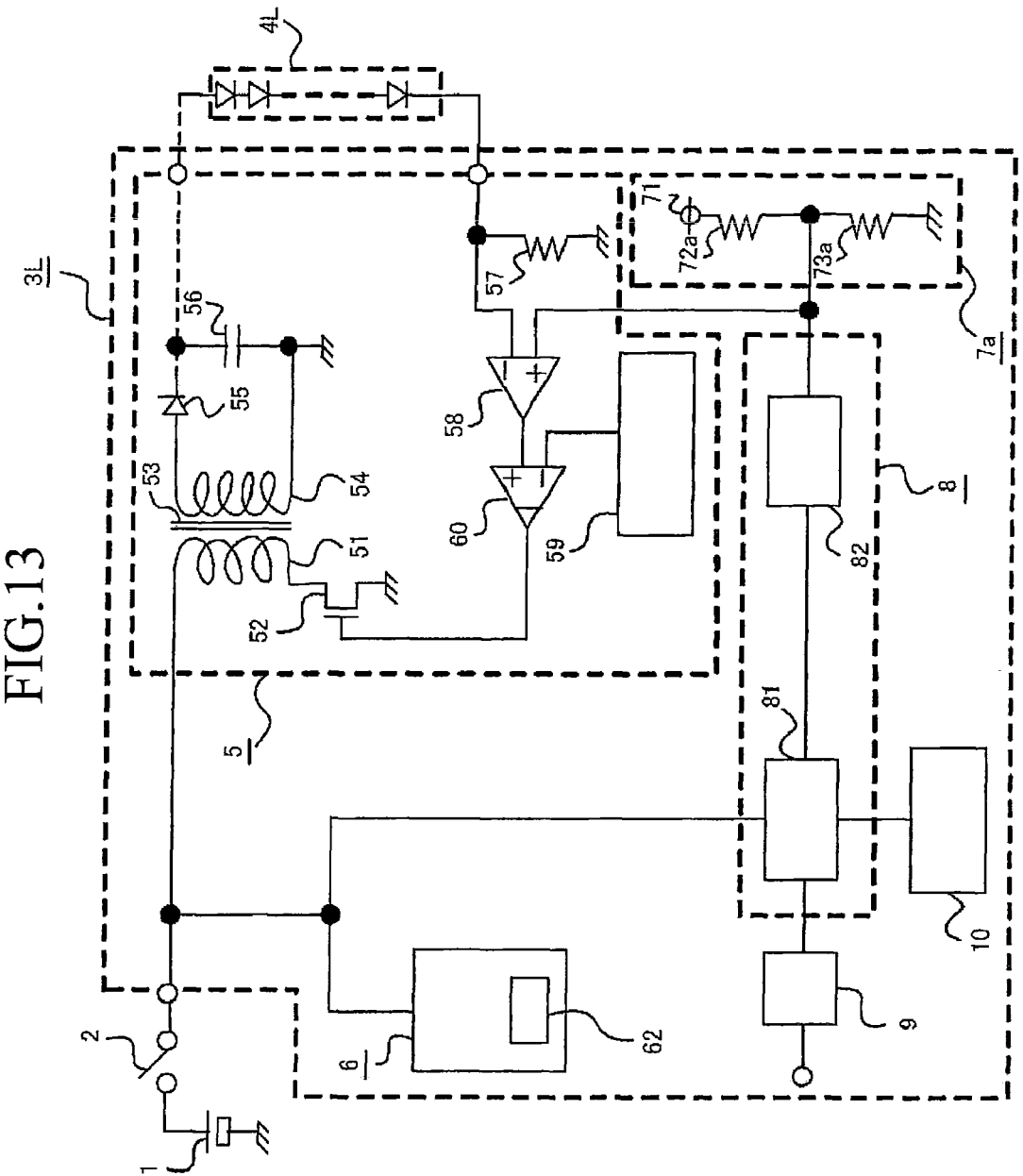
FIG. 13 is a circuit diagram of a lighting power source 3L in accordance with another embodiment of the present invention.

FIG. 13 is a circuit diagram of a lighting power source 4L in accordance with another embodiment. In FIG. 13, the parts similar or corresponding to those of FIG. 11 are designated by similar reference numerals, and these explanations will be omitted. FIG. 13 is different from FIG. 11 in having an I/F 9 and an EEPROM 10 provided therein. Note that the I/F 9 corresponds to a communication unit, and the EEPROM 10 corresponds to a storing unit.

The I/F 9 is a communication line for communicating with a machine of an external system including a CAN or a LAN, and a CPU 81 acquires information on the characteristics of the LEDs by way of the I/F 9 and causes the EEPROM 10 serving as a storage section to store the information.

In accordance with the present embodiment, by acquiring information on the characteristics of the LEDs by way of the I/F 9 and causing the EEPROM 10 serving as a storage section to store the information on the characteristics of the LEDs, it is possible to perform lighting control according to the characteristics of a plurality of LEDs with one type of lighting power sources. Further, since the communication with the external machine becomes possible, by changing the rated current value according to the characteristics of the LEDs installed therein with the external machine, it becomes possible to control the lighting of the LEDs by a predetermined amount of emission.

Incidentally, the objective to which the I/F 9 is connected can be also arranged to include an ECU, a navigation system, a diagnosis system, or the like. For example, by acquiring car speed information from an ECU or the like to increase or reduce the output of a controller 8 according to the car speed, the amount of emission can be changed. Further, the control including the reduction of the amount of emission in a town can be carried out by acquiring positional information from a navigation system.

Also, in the above, the lighting power sources 4L, 4R each have a single DC/DC converter 5 installed therein; however, each of the power sources may have a plurality of DC/DC converters installed therein. A single lighting power source can light a plurality of light-emitting units by connecting a light-emitting unit with each of the DC/DC converters.

Moreover, a single lighting power source can have a plurality of light-emitting units connected in parallel thereto. In this case, though the voltage of the same magnitude is applied to each light-emitting unit, by connecting a constant current circuit to each of the light-emitting units, the current flowing to each of the light-emitting units can be controlled. In such a way, even when a plurality of light-emitting units are connected thereto in parallel, each light-emitting unit can be lit by a predetermined amount of emission.

Additionally, in the above, the circuit construction of DC/DC converter employs a switching regulator; however, when the construction aims at the reduction of voltage, it is also possible to employ a series regulator using a variable element in place of the DC/DC converter 5.

Further, in the above, the setting value generation circuit 7 is constructed to include the reference voltage source 71, the resistor 72, the resistor 73, and the capacitor 74; however, the following construction can be used: a DC power supply that gradually increases the voltage is connected to the output side thereof. According to the construction, since the voltage of the capacitor 74 increases linearly to time, it is possible to linearly increase the amount of emission of the light-emitting unit as shown in FIG. 14. In this context, FIG. 14(*a*) shows a state of the lighting switch 2, FIG. 14(*b*) shows the amount of emission of the light-emitting unit 4L, and FIG. 14(*c*) shows the amount of emission of the light-emitting unit 4R.

Furthermore, the following example is shown in the above: the amount of emission of the light-emitting unit 4L is changed according to Eq. (2) as illustrated in FIG. 3; however, the amount of emission can be also changed such that the increment thereof increases with time. The amount of emission can be changed according to Eq. (4), for instance.

$$V(\tau) = e^{\frac{\tau}{CR}}, R = \frac{R1 \times R2}{R1 + R2} \qquad [\text{Eq. (4)}]$$

Eq. (4) is applied to the case where the capacitor 74, the resistors 72, 73 of the setting value generation circuits 7 in accordance with the first embodiment are used; however, the equation can be also applied to other embodiments. Performing such a control can make it more difficult to perceive the time difference in lighting-up.

Finally, a fail-safe control can be carried out by detecting the voltage applied to the light-emitting unit to thereby judge whether the detected voltage is abnormal. According to such a control, notwithstanding a rated current, the failures of the LEDs including the case where an abnormal voltage is applied thereto can be detected to stop the lighting of the LED.

EXPLANATION OF LETTERS OR NUMERALS

1: battery, 2: lighting switch, 3L and 3R: lighting power sources, 4L and 4R: light-emitting units, 5: DC/DC converter, 6: reference supply, 7: setting value generation circuit, 8: controller, 9: I/F, and 10: EEPROM.

The invention claimed is:

1. An LED lighting power source for a headlamp that is provided for each of left and right headlamps of a vehicle, and independently light respective light-emitting units for the left and right headlamps, the light-emitting units each including one or a plurality of LEDs, said power source comprising:
a supplying unit for supplying the electric power supplied from a battery to the light-emitting unit for a vehicle headlamp;
a current detecting unit for detecting the current flowing to the light-emitting unit to which the electric power is supplied by the supplying unit;
a current setting unit for setting a target current of the current flowing to the light-emitting unit; and
a current control unit for controlling the supplying unit such that the current detected by the current detecting coincides with the target current,
wherein the current setting unit increases the target with the passage of time by taking a period of 5 ms to 4000 ms, after the supplying unit has begun to supply electric power to the light-emitting unit,
wherein the current control unit sequentially increases the current flowing to the light-emitting unit by controlling the supplying unit in accordance with the target current increasing with the passage of time to cause the current to attain the steady-state lighting current of the lighting-emitting unit.

2. The LED lighting power source according to claim 1, wherein the current setting unit increases the target current with the passage of time by taking a period of 10 ms to 1000 ms.

3. The LED lighting power source according to claim 1, wherein the current setting unit increases the target current with the passage of time by taking a period of 20 ms to 1000 ms.

4. The LED lighting power source according to claim 1, wherein the current setting unit increases the target current with the passage of time by taking a period of 40 ms to 1000 ms.

5. The LED lighting power source according to claim 1, wherein the current setting unit increases the target current with the passage of time by taking a period of 80 ms to 1000 ms.

6. The LED lighting power source according to claim 1, wherein the current setting unit continuously changes the target current.

7. An LED lighting power source comprising:
- a supplying unit for supplying the electric power supplied from a battery to a light-emitting unit for a vehicle headlamp including one or a plurality of LEDs;
- a current detecting unit for detecting the current flowing to the light-emitting unit to which the electric power is supplied by the supplying unit;
- a current setting unit for setting a target current of the current flowing to the light-emitting unit; and
- a current control unit for controlling the supplying unit such that the current detected by the current detecting unit coincides with the target current,
- wherein the current setting unit controls the target current in such a manner as to repeat switching the target current between 0 A and the value of the steady-state lighting current, during the period after the supplying unit has begun to supply electric power to the light-emitting unit until the current flowing to the light-emitting unit attains the steady-state lighting current of the light-emitting unit, and the target current increases a ratio set to the steady-state lighting current with the passage of time.

8. An LED lighting power source comprising:
- a supplying unit for supplying the electric power supplied from a battery to a light-emitting unit for a vehicle headlamp including one or a plurality of LEDs;
- a current detecting unit for detecting the current flowing to the light-emitting unit to which the electric power is supplied by the supplying unit;
- a current setting unit for setting a target current of the current flowing to the light-emitting unit; and
- a current control unit for controlling the supplying unit such that the current detected by the current detecting unit coincides with the target current,
- wherein the current setting unit includes:
- a target control circuit for outputting a first target control signal for controlling the target current, based on the constants of constituent components; and
- a target controller for outputting a second target control signal for controlling the target current, based on information about the light-emitting unit that is set in advance,
- wherein the current setting unit increases the target current with the passage of time, during the period after the supplying unit has begun to supply electric power to the light-emitting unit until the current flowing to the light-emitting unit attains the steady-state lighting current of the light-emitting unit, based on a signal obtained by adding the first target control signal to the second one.

9. The LED lighting power source according to claim 8, wherein the target controller includes a CPU for generating the second target control signal.

10. The LED lighting power source according to claim 8, further comprising:
- a communication unit for obtaining LED information for lighting the light-emitting unit by a predetermined amount of emission from an external system; and
- a storing unit for storing the LED information obtained by the communication unit,
- wherein the target controller includes a CPU for generating the second target control signal based on the LED information.

11. An LED lighting system for a vehicle headlamp that comprises the LED lighting power source according to any of claims 7-10 for left and right head lamps of a vehicle.

\* \* \* \* \*